USOO10877837B2

(12) United States Patent
Kim

(10) Patent No.: US 10,877,837 B2
(45) Date of Patent: Dec. 29, 2020

(54) METHOD FOR RECOVERING EEPROM OF SLAVE DEVICE BY PLC COMMUNICATION MODULE

(71) Applicant: LSIS CO., LTD., Anyang-si (KR)

(72) Inventor: Hyung-Lae Kim, Anyang-si (KR)

(73) Assignee: LSIS CO., LTD., Anyang-si (KR)

( * ) Notice: Subject to any disclaimer, the term of this patent is extended or adjusted under 35 U.S.C. 154(b) by 0 days.

(21) Appl. No.: 16/539,624

(22) Filed: Aug. 13, 2019

(65) Prior Publication Data
US 2020/0167228 A1 May 28, 2020

(30) Foreign Application Priority Data

Nov. 27, 2018 (KR) .................. 10-2018-0148134

(51) Int. Cl.
| G06F 11/10 | (2006.01) |
| G11C 16/34 | (2006.01) |
| G06F 11/14 | (2006.01) |
| G11C 16/10 | (2006.01) |
| G11C 16/14 | (2006.01) |

(52) U.S. Cl.
CPC ...... *G06F 11/1004* (2013.01); *G06F 11/1068* (2013.01); *G06F 11/1441* (2013.01); *G11C 16/102* (2013.01); *G11C 16/3409* (2013.01); *G11C 16/3436* (2013.01); *G11C 16/14* (2013.01)

(58) Field of Classification Search
CPC ............. G06F 11/1004; G06F 11/1068; G11C 16/3436
See application file for complete search history.

(56) References Cited

U.S. PATENT DOCUMENTS

| 6,216,251 B1* | 4/2001 | McGinn .............. G06F 11/1032 714/800 |
| 2004/0123132 A1* | 6/2004 | Montgomery .......... G06F 21/79 726/20 |
| 2005/0122790 A1* | 6/2005 | Ueno .................. G11C 16/102 365/189.05 |
| 2010/0169632 A1 | 7/2010 | Sun et al. |
| 2013/0145085 A1 | 6/2013 | Yu et al. |

FOREIGN PATENT DOCUMENTS

| JP | 2002334024 A | 11/2002 |
| KR | 20090119110 A | 11/2009 |
| KR | 20160060670 A | 5/2016 |

OTHER PUBLICATIONS

European Search Report for related European Application No. 19190588.4; action dated Feb. 17, 2020; (6 Pages).
Korean Notice of Allowance for related Korean Application No. 10-2018-0148134; action dated Apr. 29, 2020; (2 pages).
Japanese Office Action for related Japanese Application No. 2019-147523; action dated Sep. 18, 2020; (3 pages).

* cited by examiner

*Primary Examiner* — Joseph D Torres
(74) *Attorney, Agent, or Firm* — K&L Gates LLP

(57) ABSTRACT

Disclosed is a method for automatically recovering data of an electronically erasable programmable read only memory (EEPROM) storing configuration information of a slave device by a programmable logic controller (PLC) communication module using an EtherCAT network when the data of the EEPROM is modified or incorrect.

12 Claims, 4 Drawing Sheets

METHOD FOR RECOVERING EEPROM OF SLAVE DEVICE BY PLC COMMUNICATION MODULE

CROSS-REFERENCE TO RELATED APPLICATIONS

Pursuant to 35 U.S.C. § 119(a), this application claims the benefit of earlier filing date and right of priority to Korean Application No. 10-2018-0148134 filed on Nov. 27, 2018, in the Korean Intellectual Property Office, the disclosure of which is hereby incorporated by reference in its entirety.

BACKGROUND

1. Technical Field

The present disclosure relates to a method for recovering data of an EEPROM storing configuration information of a slave device by a PLC communication module using an EtherCAT network.

2. Description of the Related Art

One of key devices in factory automation is PLC (Programmable Logic Controller). The PLC requires modules having various functions in order to deal with various applications.

The PLC may connect at least one slave device to a master device over an EtherCAT network in order to enlarge a distance between input and output terminals. In the EtherCAT network system based on communication between the master device and a plurality of slave devices at a remote location from the master device, the slave device employs an EtherCAT slave controller (ESC).

The ESC is developed and produced by various manufacturers in various forms. However, internal structures and register structures of the various ESCs are the same because the various ESCs basically comply with an EtherCAT standard. This ESC requires basic configurations to access the EtherCAT network. Thus, EEPROM or internal memory may be installed in the master device and then the ESC may fetch the configuration information from the EEPROM. Herein, using the EEPROM and using the internal memory are separated from each other. Rather, the both will be referred to as using the EEPROM.

The information stored in the EEPROM includes hardware H/W interface settings, product information, product version, and basic information required for the EtherCAT communication.

In this connection, EEPROM is basically written or read using the master device. However, each product maker may provide each interface to read and write data from and to EEPROM. Therefore, the EEPROM data may be easily changed. Thus, the EEPROM data may be modified to store erroneous data.

The most frequent cause of the occurrence of EEPROM data modification is that the manager or the like erroneously fetches information data about a slave device other than a slave device of interest and writes the data to the EEPROM. This case may be divided into three main categories as follows.

First, when there are many slave devices in the EtherCAT network, the manager may download ESI (EtherCAT Slave Information) of a slave device other than a slave device of interest from the master device while intending to download ESI about the slave device of interest. Second, the manager may download an older or newer version of ESI that is not compatible with an ESI version currently supported by a device. Third, the EEPROM data is partially lost or modified due to other environmental factors or electrical noise.

However, a conventional approach to deal with the data modification of the EEPROM does not effectively cope with the modification of the EEPROM data, and treats all of the modifications as an error regardless of the cause of the occurrence thereof.

Further, in a conventional approach to recover the data of the EEPROM, the manager may manually re-download the ESI using a dedicated program from a developer who developed the slave device of interest having the error or the master device or replace the faulty hardware.

SUMMARY

A purpose of the present disclosure is to provide a method for automatically recovering data of EEPROM storing configuration information of a slave device by a PLC communication module using an EtherCAT network when the data of EEPROM is modified or incorrect.

Further, another purpose of the present disclosure is to provide a method for automatically recovering data of EEPROM by the PLC communication module, in which data of the EEPROM compatible with firmware of the slave device is stored in a read-only permanent memory, and is used to recover the EEPROM data. However, this automatic recovery is not available in a prior art.

Further, another purpose of the present disclosure is to provide a method for recovering data of EEPROM of a slave device by the PLC communication module, in which whether an error occurs is determined based on information stored in a read-only permanent memory, and erroneous section of the data is notified to a user.

Further, another purpose of the present disclosure is to provide a method for recovering data of EEPROM of a slave device by the PLC communication module, in which when recovery is performed based on information stored in a read-only permanent memory, whether the recovery succeeds is notified to a user or a corrected section is notified to a user.

Purposes of the present disclosure are not limited to the above-mentioned purpose. Other purposes and advantages of the present disclosure as not mentioned above may be understood from following descriptions and more clearly understood from embodiments of the present disclosure. Further, it will be readily appreciated that the purposes and advantages of the present disclosure may be realized by features and combinations thereof as disclosed in the claims.

In one aspect of the present disclosure, there is proposed a method for recovering, by a programmable logic controller (PLC) communication module, data in an electrically erasable programmable read-only memory (EEPROM) storing configuration information of a slave device, the method being characterized in that the method includes: (A) analyzing original data of the EEPROM on a data section basis to compute a checksum of each data section, wherein the original data is stored in the PLC communication module; (B) analyzing EEPROM data read from the EEPROM on a data section basis to compute a checksum of each data section, wherein the EEPROM is attached to a an EtherCAT slave controller (ESC) of the slave device; (C) comparing each section-based checksum of the original data with each section-based checksum of the EEPROM data; (D) when at least one of section-based checksums mismatches between the original data and the EEPROM data, detecting at least one section having the at least one checksum having the mismatching, and indicating a flag value corresponding to the mismatching into the at least one section of the EEPROM data; and (E) informing a user of the at least one section of the EEPROM data having the flag value corresponding to the mismatching.

In one implementation, the data sections of the EEPROM data include a critical information section, a connection information section, and a communication information section.

In one implementation, the (D) includes: when all of section-based checksums mismatch between the original data and the EEPROM data, requesting reading-out of the configuration information from the EEPROM; when the reading-out is successful, checking whether the read-out configuration information is valid; and when the reading-out fails or when the read-out configuration information is invalid, treating the failure or the invalidity as the ESC error.

In one implementation, the (D) includes: when the read-out configuration information is valid, attempting to access the ESC via a processor; when the access attempting fails, treating the access failure as a hardware (H/W) heavy failure; and when the access attempting succeeds, proceeding to a next resetting operation of the ESC.

In one implementation, the configuration information is an EEPROM status register, and includes a hardware (H/W) interface configuration, product information, product version, and basic information required for EtherCAT communication.

In one implementation, the (D) includes: comparing a checksum of a critical information section of the original data with a checksum of a critical information section of the EEPROM data; when the checksum of the critical information section of the original data mismatches the checksum of the critical information section of the EEPROM data, indicating a flag value corresponding to the mismatch into the critical information section of the EEPROM data; when the checksum of the critical information section of the original data matches the checksum of the critical information section of the EEPROM data, comparing a checksum of a connection information section of the original data with a checksum of a connection information section of the EEPROM data; when the checksum of the connection information section of the original data mismatches the checksum of the connection information section of the EEPROM data, indicating a flag value corresponding to the mismatch into the connection information section of the EEPROM data; when the checksum of the connection information section of the original data matches the checksum of the connection information section of the EEPROM data, comparing a checksum of a communication information section of the original data with a checksum of a communication information section of the EEPROM data; and when the checksum of the communication information section of the original data mismatches the checksum of the communication information section of the EEPROM data, indicating a flag value corresponding to the mismatch into the communication information section of the EEPROM data.

In one implementation, the (D) further includes: when all of the checksums of the critical, connection, and communication information sections of the original data mismatches all of the checksums of the critical, connection, and communication information sections of the EEPROM data respectively, indicating a flag value corresponding to the mismatches of all of the checksums.

In one implementation, the method further includes, when the flag value corresponding to the mismatches of all of the checksums is indicated, determining that all of the critical, connection, and communication information sections of the EEPROM data are abnormal.

In one implementation, the (E) further includes overwriting a corresponding at least one section of the original data onto the at least one section of the EEPROM data to recover the at least one section of the EEPROM data.

In one implementation, the (E) further includes: checking each flag value of each section of the EEPROM data; when all flag values indicate the mismatches, overwriting an entirety of the original data as recovery data into an entirety of the EEPROM data; converting the all flag values to indicate matches; or when the all flag values do not indicate the mismatches, detecting at least one section having the mismatching, and overwriting a corresponding at least one section of the original data as recovery data onto the at least one section of the EEPROM data; and converting at least one flag value corresponding to the at least one section to indicate a match.

In one implementation, detecting the at least one section and overwriting the corresponding at least one section of the original data onto the at least one section of the EEPROM data include: when the all flag values do not indicate the mismatches, checking whether a flag value of a critical information section in the EEPROM data indicates a mismatch; when the flag value of the critical information section indicates the mismatch, checking a cyclic redundancy check (CRC) contained at an end of the critical information section; when the CRC is erroneous, re-computing the CRC and writing the re-computed CRC to recover the erroneous CRC; or when the CRC is normal, overwriting the critical information section of the original data as recovery data onto the critical information section of the EEPROM data; checking whether a flag value of a connection information section in the EEPROM data indicates a mismatch; when the flag value of the connection information section in the EEPROM data indicates the mismatch, overwriting the connection information section of the original data as recovery data onto the connection information section of the EEPROM data; checking whether a flag value of a communication information section in the EEPROM data indicates a mismatch; and when the flag value of the communication information section in the EEPROM data indicates the mismatch, overwriting the communication information section of the original data as recovery data onto the communication information section of the EEPROM data.

In one implementation, the original data is permanently stored in a flash memory.

Effects of the present disclosure are as follows but are not limited thereto.

In the recovery method of the EEPROM of the slave device by the PLC communication module according to the present disclosure, when data of the EEPROM is modified unintentionally from any external factor, the data may be automatically recovered, thereby to eliminate communication incapability between the master and slave devices due to the data error of the EEPROM.

Further, in the recovery method of the EEPROM of the slave device by the PLC communication module according to the present disclosure, when the data error occurs and then is corrected, the correction may be notified to the user using the flag such that the user may identify the corrected section and how an incorrect section is corrected.

Further, in the recovery method of the EEPROM of the slave device by the PLC communication module according to the present disclosure, when the user intends to execute a function of interest, the function is executed via a corresponding parameter setting, while only the recovery function is not executed. In this case, the user may be notified that the erroneous section occurs but may be notified that the recovery thereof is not performed.

In addition to the effects as described above, specific effects of the present disclosure are described together with specific details for carrying out the invention.

DETAILED DESCRIPTIONS

In following detailed descriptions of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Examples of various embodiments are illustrated and described further below. It will be understood that the description herein is not intended to limit the claims to the specific embodiments described. On the contrary, it is intended to cover alternatives, modifications, and equivalents as may be included within the spirit and scope of the present disclosure as defined by the appended claims.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, operations, elements, and/or components, but do not preclude the presence or addition of one or more other features, integers, operations, elements, components, and/or portions thereof.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, a recovery method of an EEPROM of a slave device by a PLC communication module according to some embodiments of the present disclosure will be described.

Figure 1:
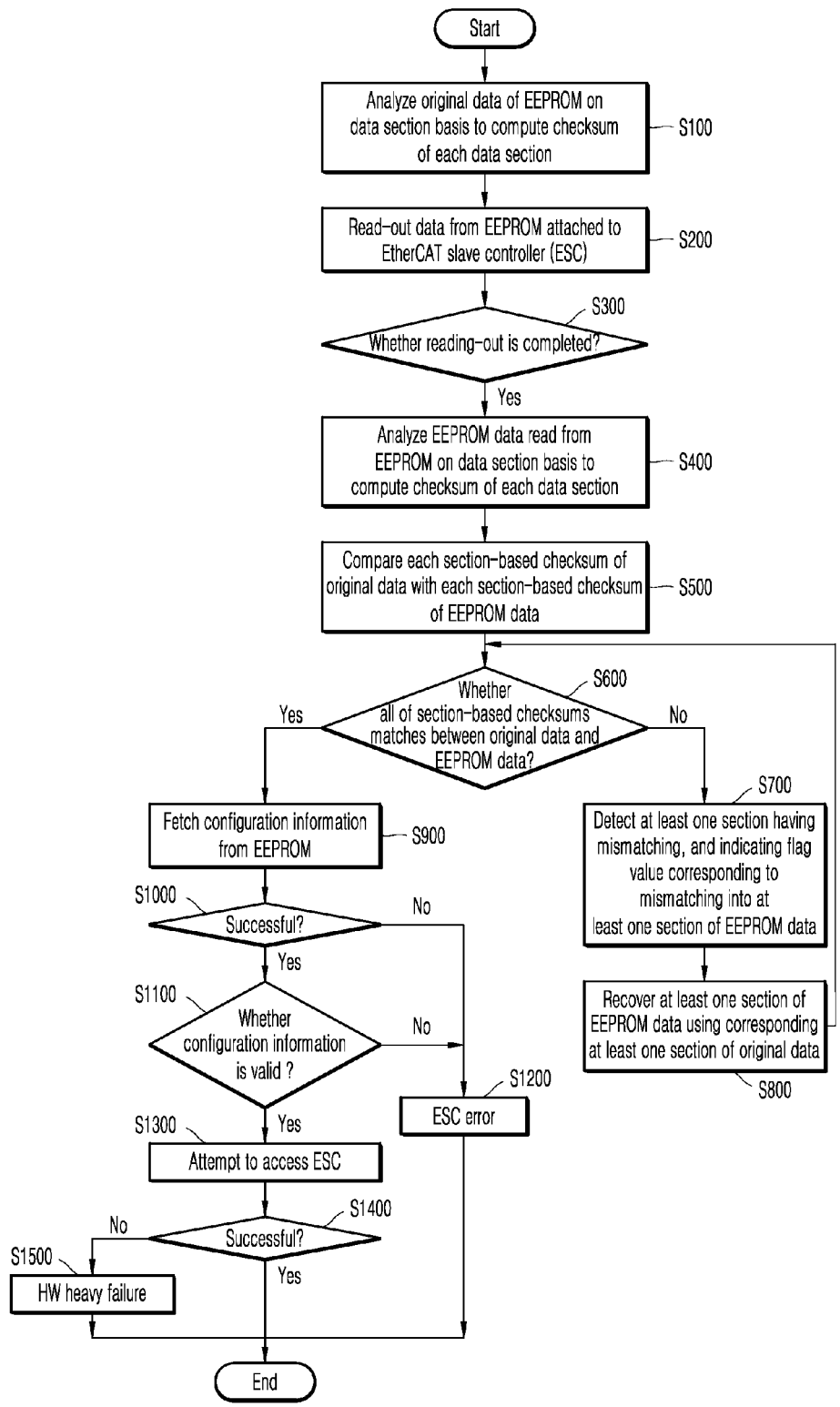
FIG. 1 is a flow chart for illustrating a recovery method of an EEPROM of a slave device by a PLC communication module.

The recovery method of the EEPROM of the slave device by the PLC communication module shown in FIG. 1 is merely one embodiment. Thus, processes or operations of the method are not limited to the embodiment as shown in FIG. 1. Some processes or operations may be added, changed or deleted as needed.

FIG. 1 is a flow chart for illustrating a recovery method of an EEPROM of a slave device by a PLC communication module.

First, referring to FIG. 1, the PLC communication module using an EtherCAT network first powers on a slave device and starts a reset process thereof. When the reset process starts, original data of EEPROM having a read-only attribute as stored in a permanent memory (flash) is analyzed to compute a checksum on a section basis S100. The computed section-based checksum may be stored in a memory.

In this connection, the original data in the EEPROM includes critical information, connection information, and communication information sections. The checksum is one of error detection schemes used to check integrity of data. The checksum is computed by summing preceding bits to a last bit. The PLC communication module uses the original data as an input data and computes a checksum on a section basis.

Figure 2:
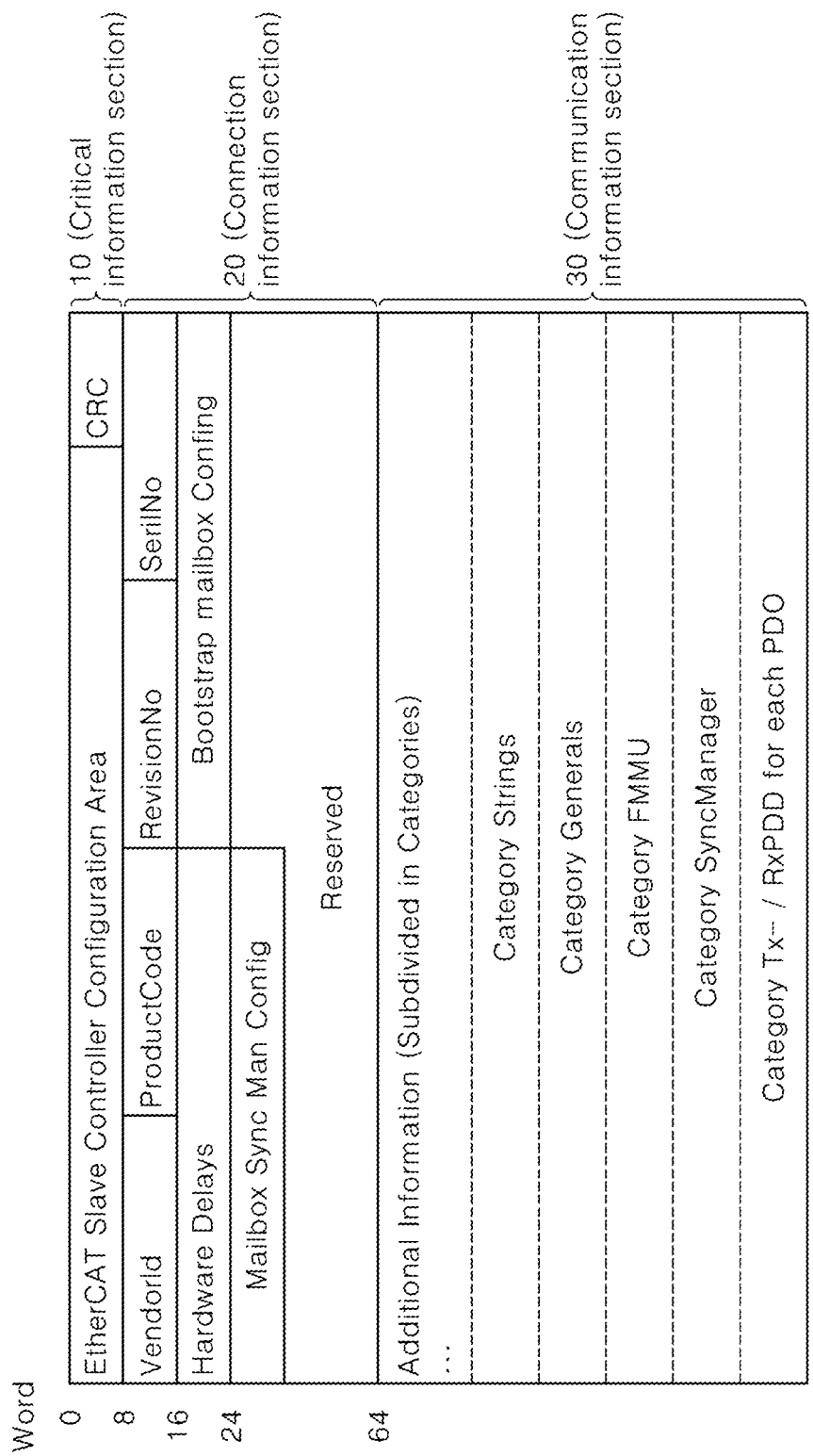
FIG. 2 shows EEPROM data in FIG. 1 in a section basis.

FIG. 2 shows a diagram of the EEPROM original data analyzed in FIG. 1 in a section basis.

As shown in FIG. 2, the EEPROM data may be broadly divided into three sections: a critical information section 10, a connection information section 20, and a communication information section 30.

In this connection, the critical information section 10 is a set of information in the PLC communication module which the ESC of the slave device uses to interface with a higher level application processor and a basic setting necessary for operating the ESC of the slave device. The connection information section 20 is a set of information in the PLC communication module that the master device uses to identify the slave device and connect thereto. Further, the communication information section 30 is a set of information in the PLC communication module about a protocol for communicating between the master device and the slave device.

Then, the PLC communication module reads out data of EEPROM attached to the ESC of the slave device S200. In this connection, the EEPROM data includes a critical information section, a connection information section, and a communication information section.

When the read-out is completed S300, the PLC communication module analyzes the read EEPROM data and computes a checksum on a section basis S400. The computed section-based checksum may be stored in a memory.

The PLC communication module compares the checksum of the EEPROM original data read from the permanent memory (flash) with the checksum of the EEPROM data read from the EEPROM of the slave device on a section basis S500.

When, from the comparison result S500, matching between at least one of the section-based checksums of the EEPROM original data read from the permanent memory (flash) and at least one of the section-based checksums of the EEPROM data read from the EEPROM of the slave device does not occur S600, the PLC communication module detects a section having the checksum mismatching. The PLC communication module indicates the mismatching using a flag on a section basis S700. In this connection, the S700 procedure will be described below with reference to FIG. 3.

In this way, the EEPROM data section with the error may be notified to the user using the flag. Thus, the user may identify the EEPROM data section with the error and how the EEPROM data section with the error is dealt with. Further, the user may recover the EEPROM data section with the error.

Accordingly, the user performs a function of interest via a corresponding parameter setting when the modification of the EEPROM data is intended by the user. In this connection, the user may disable only the recovery function. In this case, the user may be notified that the erroneous section occurs but may be notified that the recovery thereof is not performed.

Therefore, when the recovery of the EEPROM data section with the error is executed, the data error is recovered by writing a correct EEPROM data section into the EEPROM data section with the error S800. In this connection, the recovery of the data error may be based on the original data of the EEPROM having the read-only attribute stored in a permanent memory (flash). In this connection, the S800 procedure is described below with reference to FIG. 4.

When, from the comparison result S500, matchings between all of the section-based checksums of the EEPROM original data read from the permanent memory (flash) and all of the section-based checksums of the EEPROM data read from the EEPROM of the slave device occur S600, the PLC communication module requests fetching of EEPROM configuration information from the EEPROM attached to the ESC of the slave device S900. In this connection, the EEPROM configuration information may include an EEPROM status register. The EEPROM configuration information may include hardware H/W interface settings, product information, product version, and basic information required for EtherCAT communication.

If the fetching of the EEPROM configuration information in response to the request succeeds S1000, the PLC communication module checks whether the fetched EEPROM configuration information is valid S1100.

In this connection, if the fetching of the EEPROM configuration information fails, or if the EEPROM configuration information read is invalid, the PLC communication module treats this situation as the ESC error 1200.

When the PLC communication module treats this situation as the ESC error 1200, the PLC communication module indicates the ESC error externally so that the ESI may be downloaded again. To this end, a master device or a dedicated program from a developer who developed the slave device may be used. Checking whether the fetched EEPROM configuration information is valid may include CRC (cyclic redundancy check) contained in the critical information section of the EEPROM data.

When it is determined that the fetched EEPROM configuration information is valid S1100, a processor attempts to access the ESC S1300.

When the processor attempts to access the ESC S1300, the access to the ESC may fail S1400. In this case, the PLC communication module treats this situation as hardware (H/W) heavy failure. When the PLC communication module treats this situation as the hardware (H/W) heavy failure, the PLC communication module may indicate the hardware fault externally so that the faulty hardware may be replaced.

To the contrary, when the processor attempts to access the ESC S1300, the access to the ESC may succeed S1400. In this case, the PLC communication module may proceed to a next resetting process of the ESC.

In this way, when the data of the EEPROM is modified unintentionally from any external factor, the data may be automatically recovered, thereby to eliminate communication incapability between the master and slave devices due to the data error of the EEPROM.

Figure 3:
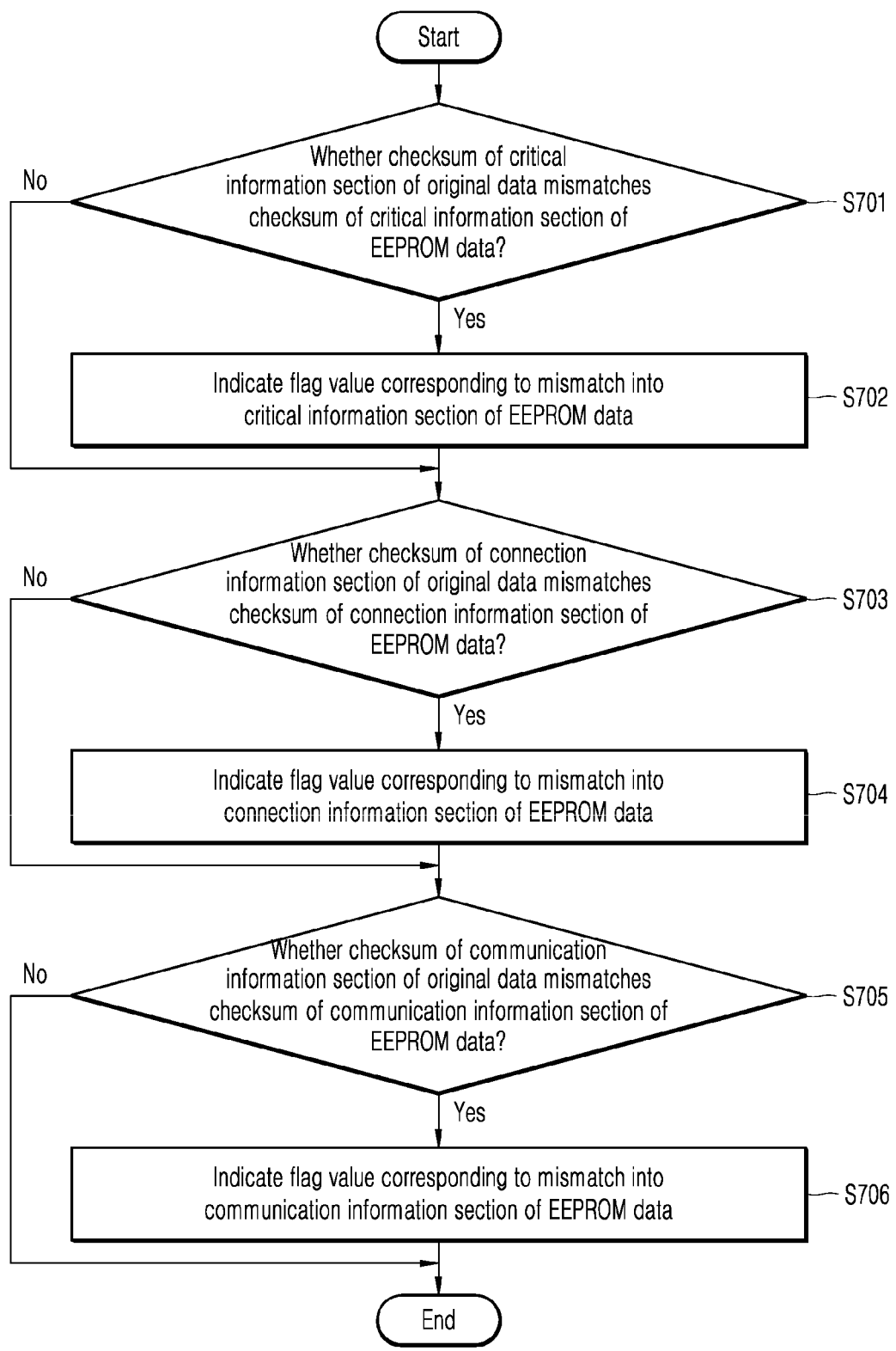
FIG. 3 is a flow chart detailing a process of detecting a non-matching EEPROM data section in FIG. 1.

FIG. 3 is a flow chart detailing a process of detecting an inconsistent EEPROM data section in FIG. 1.

Referring to FIG. 3, the PLC communication module compares the checksum of the critical information section 10 of the original data of the EEPROM read from the permanent memory (flash) with the checksum of the critical information section 10 of the EEPROM data read from the EEPROM of the slave device (this operation may be referred to as "first comparison") S701.

When from the first comparison result S701, the checksum of the critical information section 10 of the original data of the EEPROM read from the permanent memory (flash) mismatches the checksum of the critical information section 10 of the EEPROM data read from the EEPROM of the slave device, the PLC communication module indicates this mismatch or error into the critical information section 10 of the EEPROM data using a flag S702.

Otherwise, when from the first comparison result S701, the checksum of the critical information section 10 of the original data of the EEPROM read from the permanent memory (flash) matches the checksum of the critical information section 10 of the EEPROM data read from the EEPROM of the slave device, the PLC communication module compares the checksum of the connection information section 20 of the original data of the EEPROM read from the permanent memory (flash) with the checksum of the connection information section 20 of the EEPROM data read from the EEPROM of the slave device (this operation may be referred to as "second comparison") S703.

When from the second comparison result S703, the checksum of the connection information section 20 of the original data of the EEPROM read from the permanent memory (flash) mismatches the checksum of the connection information section 20 of the EEPROM data read from the EEPROM of the slave device, the PLC communication module indicates this mismatch or error into the connection information section 20 of the EEPROM data using a flag S704.

Otherwise, when from the second comparison result S703, the checksum of the connection information section 20 of the original data of the EEPROM read from the permanent memory (flash) matches the checksum of the connection information section 20 of the EEPROM data read from the EEPROM of the slave device, the PLC communication module compares the checksum of the communication information section 30 of the original data of the EEPROM read from the permanent memory (flash) with the checksum of the communication information section 30 of the EEPROM data read from the EEPROM of the slave device (this operation may be referred to as "third comparison") S705.

When from the third comparison result S705, the checksum of the communication information section 30 of the original data of the EEPROM read from the permanent memory (flash) mismatches the checksum of the communication information section 30 of the EEPROM data read from the EEPROM of the slave device, the PLC communication module indicates this mismatch or error into the communication information section 30 of the EEPROM data using a flag S706.

Otherwise, from the third comparison result S705, the checksum of the communication information section 30 of the original data of the EEPROM read from the permanent memory (flash) matches the checksum of the communication information section 30 of the EEPROM data read from the EEPROM of the slave device. In this case, each of the critical information section 10, the connection information section 20, and the communication information section 30 may have a flag indicating a normal state.

However, all of the critical information section 10, the connection information section 20, and the communication information section 30 may have a flag indicating an abnormal state. In this case, all of the connection information section 20, and the communication information section 30 should be recovered. Further, a special flag indicating that all of the critical information section 10, the connection information section 20, and the communication information section 30 are abnormal may be defined and indicated. The special flag may correspond to an entire section recovery flag.

In one example, when the flag value is '1', this indicates that a corresponding section of the EEPROM data of the slave device is incorrect due to the modification or the like. Otherwise, when the flag value is '0', this indicates that a corresponding section of the EEPROM data of the slave device is correct or in a normal state.

To be specific, when the checksum of the critical information section 10 of the original data of the EEPROM read from the permanent memory (flash) mismatches the checksum of the critical information section 10 of the EEPROM data read from the EEPROM of the slave device, the PLC communication module indicates the flag value 1 into the critical information section 10 of the EEPROM data.

Otherwise, when from the first comparison result S701, the checksum of the critical information section 10 of the original data of the EEPROM read from the permanent memory (flash) matches the checksum of the critical information section 10 of the EEPROM data read from the EEPROM of the slave device, the PLC communication module indicates the flag value 0 into the critical information section 10 of the EEPROM data.

When from the second comparison result S703, the checksum of the connection information section 20 of the original data of the EEPROM read from the permanent memory (flash) mismatches the checksum of the connection information section 20 of the EEPROM data read from the EEPROM of the slave device, the PLC communication module indicates the flag value 1 into the connection information section 20 of the EEPROM data.

Otherwise, when from the second comparison result S703, the checksum of the connection information section 20 of the original data of the EEPROM read from the permanent memory (flash) matches the checksum of the connection information section 20 of the EEPROM data read from the EEPROM of the slave device, the PLC communication module indicates the flag value 0 into the connection information section 20 of the EEPROM data.

When the checksum of the communication information section 30 of the original data of the EEPROM read from the permanent memory (flash) matches the checksum of the communication information section 30 of the EEPROM data read from the EEPROM of the slave device, the PLC communication module indicates the flag value 0 into the communication information section 30 of the EEPROM data.

Thus, the PLC communication module may check the flag value of each EEPROM data section and then may not correct the error but may transmit the error indication to the user using the flag.

Figure 4:
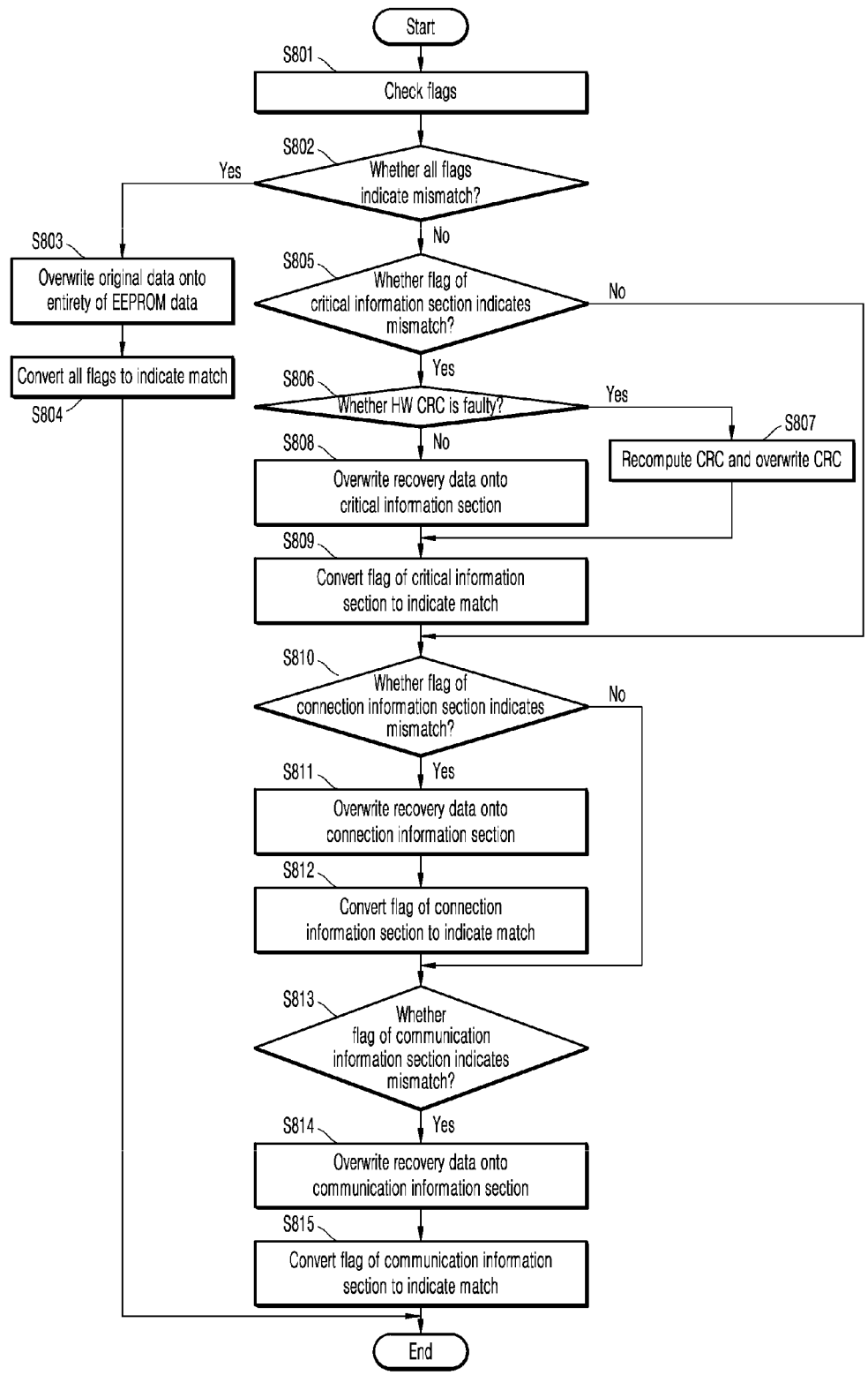
FIG. 4 is a flow chart detailing a process of recovering data error using recovery data in FIG. 1.

FIG. 4 is a flow chart detailing a process of recovering data error using recovery data in FIG. 1.

Referring to FIG. 4, the PLC communication module may check the flag value of each EEPROM data section S801 (this checking operation may be referred to as first checking". The PLC communication module may check the flag value of each EEPROM data section S801 on a section basis. In an alternative, the PLC communication module may check the special flag indicating that all of the critical information section 10, the connection information section 20, and the communication information section 30 are abnormal.

When, from the first checking result S801, all of the flags indicating the states of the critical information section 10, the connection information section 20, and the communication information section 30 have the value 1 indicating the error state S802, the entirety of the EEPROM original data having the read-only attribute as stored in the permanent memory may be written, as recovery data, into the entirety of the EEPROM data of the slave device S803.

Then, the PLC communication module may convert all of the flags indicating the states of the critical information section 10, the connection information section 20, and the communication information section 30 to have the value 0 indicating the normal state S804.

When, from the first checking result S801, all of the flags indicating the states of the critical information section 10, the connection information section 20, and the communication information section 30 do not have the value 1 indicating the error state S802, the PLC communication module may check whether the flag corresponding to the critical information section of EEPROM data has a value 1 or 0 (this checking being a second checking) S805.

When from the second checking result S805, the flag corresponding to the critical information section of EEPROM data has a value 1, the PLC communication module may check the CRC contained at an end of the critical information section S806. When it is determined in step S806 that the CRC error is detected, only the CRC having the error is re-computed and then the re-computed CRC data is written to recover the error S807.

Otherwise, when from the CRC checking result S806, there is no CRC error, the PLC communication module may write the critical information data of the EEPROM original data having the read-only attribute as stored in the permanent memory, as recovery data, in the critical information section of EEPROM data of the slave device S808.

Then, the PLC communication module may convert the critical information section flag of the EEPROM data to 0 indicating the normal state S809.

Then, the PLC communication module may check whether the flag corresponding to the connection information section 20 of EEPROM data has a value 1 or 0 (this checking being a third checking) S810.

When from the third checking result S810, the flag corresponding to the connection information section of EEPROM data has a value 1, the PLC communication module may write the connection information data of the EEPROM original data having the read-only attribute as stored in the permanent memory, as recovery data, in the connection information section of EEPROM data of the slave device S811.

Then, the PLC communication module may convert the connection information section flag of the EEPROM data to 0 indicating the normal state S812.

Then, the PLC communication module may check whether the flag corresponding to the communication information section 30 of EEPROM data has a value 1 or 0 (this checking being a fourth checking) S813.

When from the fourth checking result S813, the flag corresponding to the communication information section of EEPROM data has a value 1, the PLC communication module may write the communication information data of the EEPROM original data having the read-only attribute as stored in the permanent memory, as recovery data, in the communication information section of EEPROM data of the slave device S814.

Then, the PLC communication module may convert the communication information section flag of the EEPROM data to 0 indicating the normal state S815.

In this connection, unlike the critical information section, the connection information section and the communication information section do not have the CRC. Thus, for the connection information section and the communication information section, the CRC checking may be omitted.

All of the disclosed methods and procedures described in this disclosure can be implemented, at least in part, using one or more computer programs or components. These components may be provided as a series of computer instructions on any conventional computer readable medium or machine readable medium, including volatile and nonvolatile memory, such as RAM, ROM, flash memory, magnetic or optical disks, optical memory, or other storage media. The instructions may be provided as software or firmware, and may be implemented in whole or in part in hardware components such as ASICs, FPGAs, DSPs, or any other similar devices. The instructions may be configured to be executed by one or more processors or other hardware components which, when executing the series of computer instructions, perform or facilitate the performance of all or part of the disclosed methods and procedures.

Although the present disclosure has been described with reference to the drawings illustrating the present disclosure, the present disclosure is not limited to the embodiments and drawings disclosed in the present specification. It will be apparent that various modifications may be made by those skilled in the art within the scope of the present disclosure. In addition, it should be appreciated that effects to be achieved from configurations of the present disclosure as not expressly mentioned may be acknowledged.

What is claimed is:

1. A method for recovering data of an EEPROM storing configuration information of a slave device by a PLC communication module including the steps of:
    (A) analyzing original data of the EEPROM on a data section basis to compute a checksum of each data section, wherein the original data is stored in the PLC communication module;
    (B) analyzing EEPROM data read from the EEPROM on a data section basis to compute a checksum of each data section, wherein the EEPROM is attached to an EtherCAT slave controller (ESC) of the slave device;
    (C) comparing each section-based checksum of the original data with each section-based checksum of the EEPROM data;
    (D) when at least one of the section-based checksums mismatches between the original data and the EEPROM data, detecting at least one section having the at least one checksum having the mismatching, and indicating a flag value corresponding to the mismatching into the at least one section of the EEPROM data; and
    (E) informing a user of the at least one section of the EEPROM data having the flag value corresponding to the mismatching.

2. The method of claim 1, wherein the data sections of the EEPROM data include a critical information section, a connection information section, and a communication information section.

3. The method of claim 1, wherein the step (D) includes:
    when all of the section-based checksums mismatch between the original data and the EEPROM data, requesting reading-out of the configuration information from the EEPROM;
    when the reading-out is successful, checking whether the read-out configuration information is valid; and
    when the reading-out fails or when the read-out configuration information is invalid, treating the failure or the invalidity as the ESC error.

4. The method of claim 3, wherein the step (D) includes:
    when the read-out configuration information is valid, attempting to access the ESC via a processor;
    when the access attempting fails, treating the access failure as a hardware (H/W) heavy failure; and
    when the access attempting succeeds, proceeding to a next resetting operation of the ESC.

5. The method of claim 3, wherein the configuration information is an EEPROM status register, and includes a hardware (H/W) interface configuration, product information, product version, and basic information required for EtherCAT communication.

6. The method of claim 1, wherein the step (D) includes:
    comparing a checksum of a critical information section of the original data with a checksum of a critical information section of the EEPROM data;
    when the checksum of the critical information section of the original data mismatches the checksum of the critical information section of the EEPROM data, indicating a flag value corresponding to the mismatch into the critical information section of the EEPROM data;
    when the checksum of the critical information section of the original data matches the checksum of the critical information section of the EEPROM data, comparing a checksum of a connection information section of the original data with a checksum of a connection information section of the EEPROM data;
    when the checksum of the connection information section of the original data mismatches the checksum of the connection information section of the EEPROM data, indicating a flag value corresponding to the mismatch into the connection information section of the EEPROM data;
    when the checksum of the connection information section of the original data matches the checksum of the connection information section of the EEPROM data, comparing a checksum of a communication information section of the original data with a checksum of a communication information section of the EEPROM data; and
    when the checksum of the communication information section of the original data mismatches the checksum of the communication information section of the EEPROM data, indicating a flag value corresponding to the mismatch into the communication information section of the EEPROM data.

7. The method of claim 6, wherein the step (D) further includes:
    when all of the checksums of the critical, connection, and communication information sections of the original data mismatches all of the checksums of the critical, connection, and communication information sections of the EEPROM data respectively, indicating a flag value corresponding to the mismatches of all of the checksums.

8. The method of claim 7, wherein the method further includes, when the flag value corresponding to the mismatches of all of the checksums is indicated, determining that all of the critical, connection, and communication information sections of the EEPROM data are abnormal.

9. The method of claim 1, wherein the step (E) further includes overwriting a corresponding at least one section of the original data onto the at least one section of the EEPROM data to recover the at least one section of the EEPROM data.

10. The method of claim 9, wherein the step (E) further includes:
checking each flag value of each section of the EEPROM data;
when all flag values indicate the mismatches, overwriting an entirety of the original data as recovery data into an entirety of the EEPROM data;
converting the all flag values to indicate matches; or
when the all flag values do not indicate the mismatches, detecting at least one section having the mismatching, and overwriting a corresponding at least one section of the original data as recovery data onto the at least one section of the EEPROM data; and
converting at least one flag value corresponding to the at least one section to indicate a match.

11. The method of claim 10, wherein detecting the at least one section and overwriting the corresponding at least one section of the original data onto the at least one section of the EEPROM data include:
when the all flag values do not indicate the mismatches, checking whether a flag value of a critical information section in the EEPROM data indicates a mismatch;
when the flag value of the critical information section indicates the mismatch, checking a cyclic redundancy check (CRC) contained at an end of the critical information section;
when the CRC is erroneous, re-computing the CRC and writing the re-computed CRC to recover the erroneous CRC; or
when the CRC is normal, overwriting the critical information section of the original data as recovery data onto the critical information section of the EEPROM data;
checking whether a flag value of a connection information section in the EEPROM data indicates a mismatch;
when the flag value of the connection information section in the EEPROM data indicates the mismatch, overwriting the connection information section of the original data as recovery data onto the connection information section of the EEPROM data;
checking whether a flag value of a communication information section in the EEPROM data indicates a mismatch; and
when the flag value of the communication information section in the EEPROM data indicates the mismatch, overwriting the communication information section of the original data as recovery data onto the communication information section of the EEPROM data.

12. The method of claim 1, wherein the original data is permanently stored in a flash memory.

* * * * *